United States Patent
Kikuchi

(10) Patent No.: US 7,852,575 B2
(45) Date of Patent: Dec. 14, 2010

(54) LENS APPARATUS AND IMAGING TAKING APPARATUS USING THE SAME

(75) Inventor: Takayuki Kikuchi, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 12/035,896

(22) Filed: Feb. 22, 2008

(65) Prior Publication Data
US 2008/0225407 A1  Sep. 18, 2008

(30) Foreign Application Priority Data
Mar. 12, 2007  (JP) .............................. 2007-061552

(51) Int. Cl.
*G02B 7/02* (2006.01)
(52) U.S. Cl. ..................................... 359/819
(58) Field of Classification Search ......... 359/694–698, 359/819
See application file for complete search history.

(56) References Cited

U.S. PATENT DOCUMENTS

| | | | |
|---|---|---|---|
| 4,621,906 A * | 11/1986 | Hashimoto et al. .......... | 359/698 |
| 4,912,494 A | 3/1990 | Tanaka et al. ............... | 354/402 |
| 5,005,956 A | 4/1991 | Kaneda et al. ............... | 350/429 |
| 5,369,461 A | 11/1994 | Hirasawa et al. ............ | 354/402 |
| 5,444,510 A | 8/1995 | Okano et al. ................ | 354/400 |
| 5,946,504 A | 8/1999 | Hirasawa et al. ............. | 396/80 |
| 5,999,746 A | 12/1999 | Kitagawa ...................... | 396/52 |
| 7,218,849 B2 * | 5/2007 | Hirai ............................ | 396/280 |
| 2002/0047912 A1 * | 4/2002 | Mabuchi et al. ............. | 348/345 |

FOREIGN PATENT DOCUMENTS

| | | |
|---|---|---|
| JP | 2-39780 | 2/1990 |
| JP | 6-98240 | 4/1994 |
| JP | 2005-106949 | 4/2005 |

OTHER PUBLICATIONS

European Search Report dated Apr. 8, 2009, in application No. 01852390.4 -2209/1975696.

* cited by examiner

*Primary Examiner*—Scott J Sugarman
*Assistant Examiner*—Vipin M Patel
(74) *Attorney, Agent, or Firm*—Fitzpatrick, Cella, Harper & Scinto

(57) ABSTRACT

Data related to an object distance which is sent from a camera apparatus is captured. A focus lens position instructed value CL is calculated based on an object distance instructed value CD and a zoom position information value ZP. An object distance returned value PL to be transmitted to the camera apparatus is obtained based on a current lens position CF and the zoom position information value ZP. Whether the focus lens position instructed value CL is equal to the lens position CF or not is determined. When the focus lens position instructed value is not equal to the lens position, a focus lens is moved in accordance with the focus lens position instructed value CL is performed. When the focus lens position instructed value is equal to the lens position, lens driving processing is not performed.

10 Claims, 6 Drawing Sheets

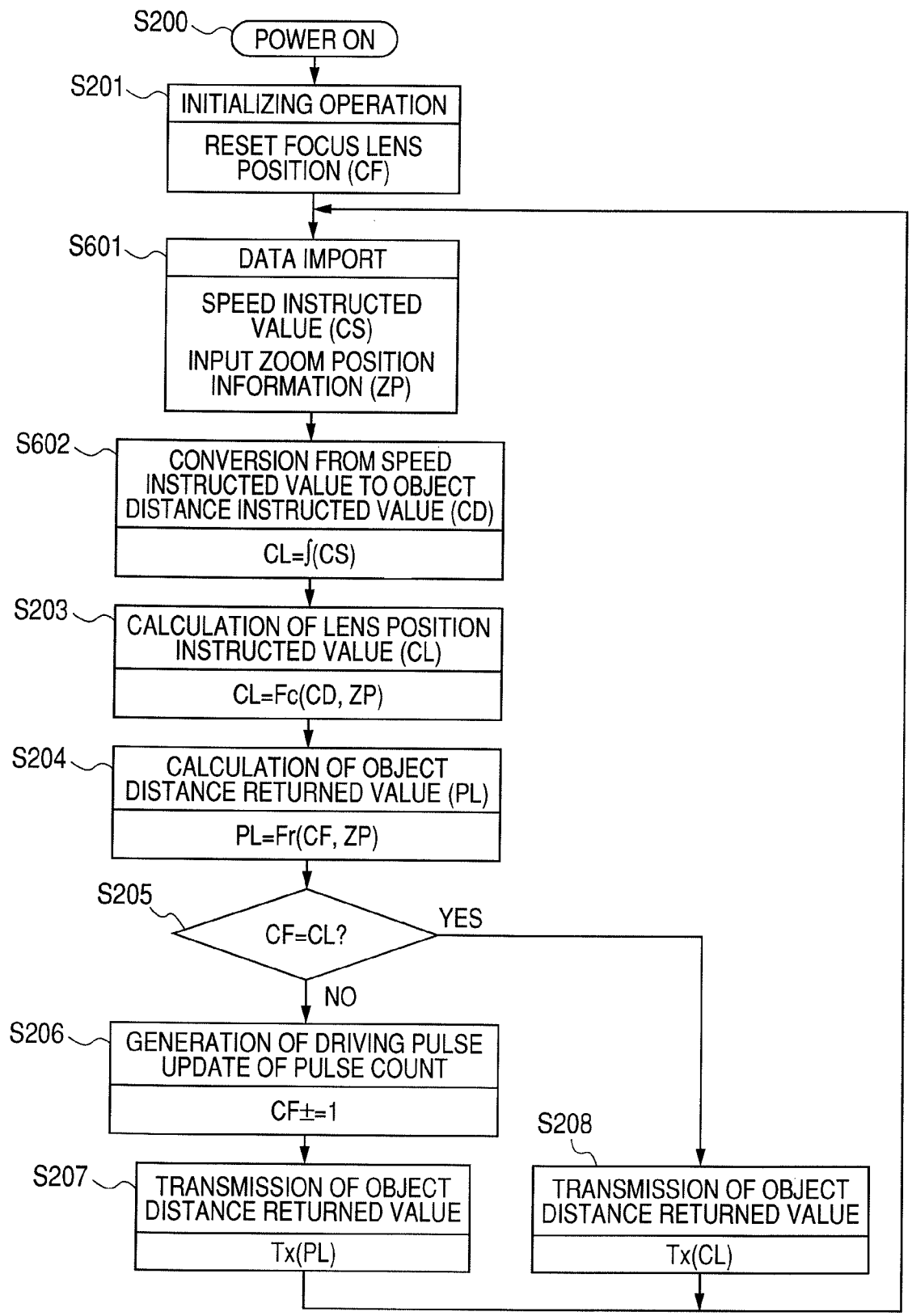

LENS APPARATUS AND IMAGING TAKING APPARATUS USING THE SAME

BACKGROUND OF THE INVENTION

1. Field of the Invention

The present invention relates to a lens apparatus which is used for a video camera, a digital camera, and a television camera and performs auto-focal point detection (AF) control based on an object image, and an image taking apparatus including the lens apparatus and a camera apparatus attachable to and detachable from the lens apparatus.

2. Description of the Related Art

In recent years, it is essential for an image taking apparatus such as a consumer digital camera or a consumer video camera to have an AF function.

A mainstream of such a kind of AF is an auto-focal point detection system for extracting a signal corresponding to the sharpness level of an object from an image pickup signal to perform its evaluation and for executing the focal point detection operation of an optical system based on the evaluation.

The demand for an increase in image quality is high and an interchangeable lens system is used in many cases. In the case of a camera system in which a lens is attachable to and detachable from a camera, there is a system in which AF processing is performed by the camera and a driving instruction is transmitted to the lens.

Examples of an instruction of a focus position which is communicated between the lens and the camera includes an instruction of, a physical position of a lens, that is, a lens position, and an instruction of an object distance. In the latter case of the instruction of the object distance, a range of the instruction is not changed by the optical magnification of the lens, so that suitable compatibility is obtained.

FIG. 7 is a structural block circuit diagram illustrating an AF system of an interchangeable lens type camera system in which a focus driving instruction and focus position information are communicated as described above. A lens apparatus 2 is attachable to and detachable from a camera apparatus 1. A signal obtained by photoelectric conversion in a CCD 3 of the camera apparatus 1 is processed into an image signal by an image signal generating portion 4.

An AF processing portion 5 extracts an edge component from the image signal. An object distance instructed value for driving a focus lens 12 of the lens apparatus 2 which is required to maximize the edge component is data-processed so as to be adapted to a communication format with the lens apparatus 2, and then output to the lens apparatus 2.

The lens apparatus 2 detects the object distance instructed value from a communication data series input to a camera interface portion 7. A distance/lens position conversion portion 8 converts the object distance instructed value into a focus lens position instructed value.

At this time, zoom position information of a zoom lens 9 is read by a zoom position detecting portion 10. The distance/lens position conversion portion 8 calculates (converts) the zoom position information and the object distance instructed value as the focus lens position instructed value using a conversion table.

The focus lens position instructed value converted in the distance/lens position conversion portion 8 is supplied to a focus driving portion 11.

The focus driving portion 11 generates a drive pulse for leading the focus lens 12 to a position specified by the focus lens position instructed value, thereby driving a focus motor 13.

An object distance value is calculated based on an output from the focus driving portion 11 and an output from the zoom position detecting portion 10 by a lens position-distance conversion portion 14 and input to the AF processing portion 5 through the camera interface portion 7 and a lens interface portion 6.

Then, the AF processing portion 5 checks a current position of the focus lens 12 and makes a determination if the focus lens 12 is being driven or stopped. The AF processing portion 5 obtains an object distance instructed value based on edge component information included in a current image signal and transmits the obtained object distance instructed value to the lens apparatus 2.

When such a series of operations is repeated, the focus lens 12 can be led to a focusing position.

In the conventional example, the distance instruction is transmitted from the camera to the lens while the camera determines the object distance during the AF operation, so there is the following problem.

That is, in the case of a rear focus lens, a moving distance value of the focus lens which covers an object distance range between a close side and an infinite side is changed corresponding to the zoom position.

For example, in the case of a tele-photo end, a driving amount of a step motor which corresponds to the moving distance of the focus lens 12 which is necessary to cover the range between the close side and the infinite side is 2,000 pulses. In contrast to this, in the case of a wide-angle end, the driving amount is 10 pulses.

Therefore, when the object distance value is calculated based on a pulse count, the object distance value is changed in 2,000 steps in the case of the tele-photo end. In the case of the wide-angle end, the object distance value is changed in mere 10 steps.

In other words, when the position of the close side is expressed by 0x0000 (16 bits) and the position of the infinite side is expressed by 0xFFFF (16 bits), the object distance value in the case of the tele-photo end varies by 0x20 for each pulse and the object distance value in the case of the wide-angle end varies by 0x1999 for each pulse.

Thus, a threshold value for determining a state of the focus lens 12 in the camera apparatus 1 should be changed according to the zoom position.

SUMMARY OF THE INVENTION

An object of the present invention is to solve the problem as described above and provide a lens apparatus whose focus control can be executed by a camera using a calculated object distance value to which interpolation data is added, without depending on a lens.

In order to solve the problem as described above, according to an aspect of the present invention, there is provided a lens apparatus which is attachable to and detachable from a camera apparatus and has an optical mechanism. The lens apparatus includes: receiving unit for receiving a driving instruction for changing a state of the optical mechanism from the camera apparatus; driving unit for driving the optical mechanism based on the driving instruction; detecting unit for detecting position information of the optical mechanism; and transmission unit for transmitting one of the position information and the driving instruction to the camera apparatus, in which: when the driving unit drives the optical mechanism, the transmission unit transmits the position information detected by the detecting unit to the camera apparatus; and when the driving unit does not drive the optical mechanism, the transmission unit transmits the driving instruction to the camera apparatus.

In the lens apparatus, the optical mechanism may include a focus lens.

Moreover, the lens apparatus may further include a zoom lens and a driving amount of the focus lens may be changed corresponding to a position of the zoom lens.

According to another aspect of the present invention, there is provided an image taking apparatus including the above-mentioned lens apparatus and a camera apparatus attachable to and detachable from the lens apparatus.

According to the image taking apparatus of the present invention, the focus control can be executed by the camera apparatus without depending on the lens and a position information error between the lens apparatus and the camera apparatus during an actual operation can be suppressed to transmit high-precision position information to the camera apparatus.

Further features of the present invention will become apparent from the following description of exemplary embodiments with reference to the attached drawings.

BRIEF DESCRIPTION OF THE DRAWINGS

FIG. 6 is an operational flow chart in Embodiment 2.

DESCRIPTION OF THE EMBODIMENTS

The present invention will be described in detail with reference to embodiments illustrated in FIGS. 1 to 6.

Embodiment 1

Figure 1:
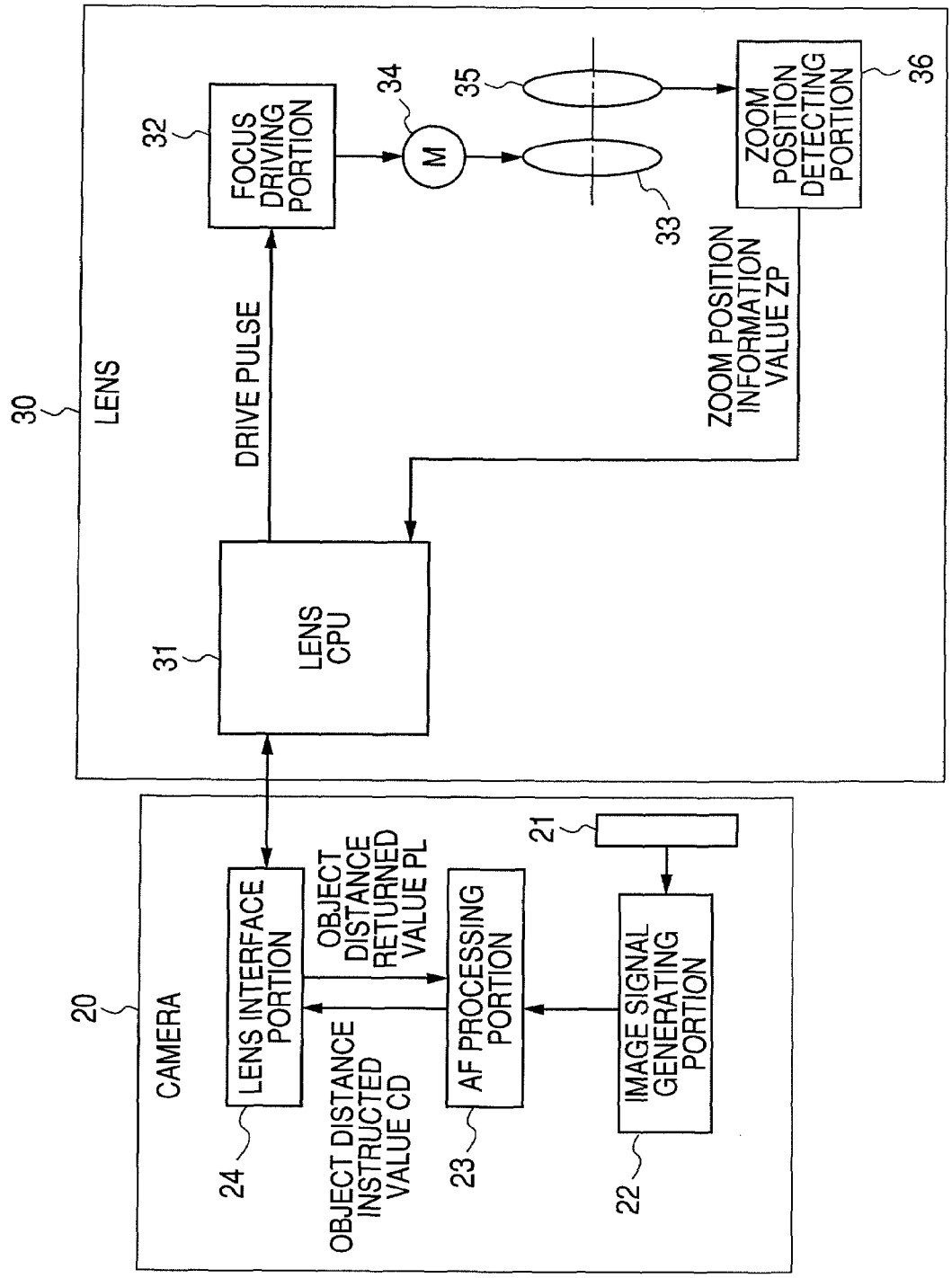
FIG. 1 is a structural block circuit diagram illustrating Embodiment 1 of the present invention.

FIG. 1 is a structural diagram illustrating this embodiment. A lens apparatus 30 is interchangeably attached to a camera apparatus 20.

In the camera apparatus 20, an output from a CCD 21 is connected to an AF processing portion 23 through an image signal generating portion 22. The AF processing portion 23 includes a CPU and corresponds to a camera control unit in the camera apparatus 20.

The AF processing portion 23 is connected with a lens interface portion 24.

The image signal generating portion 22 converts a signal obtained by photoelectric conversion in the CCD 21 into an image signal.

The AF processing portion 23 generates AF drive instructed information based on the image information from the image signal generating portion 22 and various lens state information from the lens apparatus 30, and outputs the AF drive instructed information to the lens apparatus 30.

The lens interface portion 24 receives information generated in the lens apparatus 30 and transmits various lens driving instructions.

In the lens apparatus 30, a lens CPU 31 is connected with the lens interface portion 24 of the camera apparatus 20, includes a CPU, and performs lens control on the lens apparatus 30. An output from the lens CPU 31 is connected to a focus driving portion 32.

An output from the focus driving portion 32 is connected to a focus motor 34 serving as a step motor which drives a focus lens 33 and discretely operates.

An output from a zoom position detecting portion 36 including an encoder for, for example, discretely detecting a position of a zoom lens 35 is connected to the lens CPU 31.

The signal obtained by photoelectric conversion in the CCD 21 of the camera apparatus 20 is processed into the image signal by the image signal generating portion 22.

The AF processing portion 23 extracts an edge component from the image signal by a high-pass filter (HPF), or the like, obtains an object distance instructed value CD for driving the focus lens 33 which is required to maximize the edge component, and outputs the object distance instructed value CD to the lens interface portion 24.

The lens interface portion 24 data-processes the object distance instructed value CD from the AP processing portion 23 so as to be adapted to a communication format with the lens apparatus 30 and then outputs the processed object distance instructed value CD to the lens apparatus 30.

Figure 2:
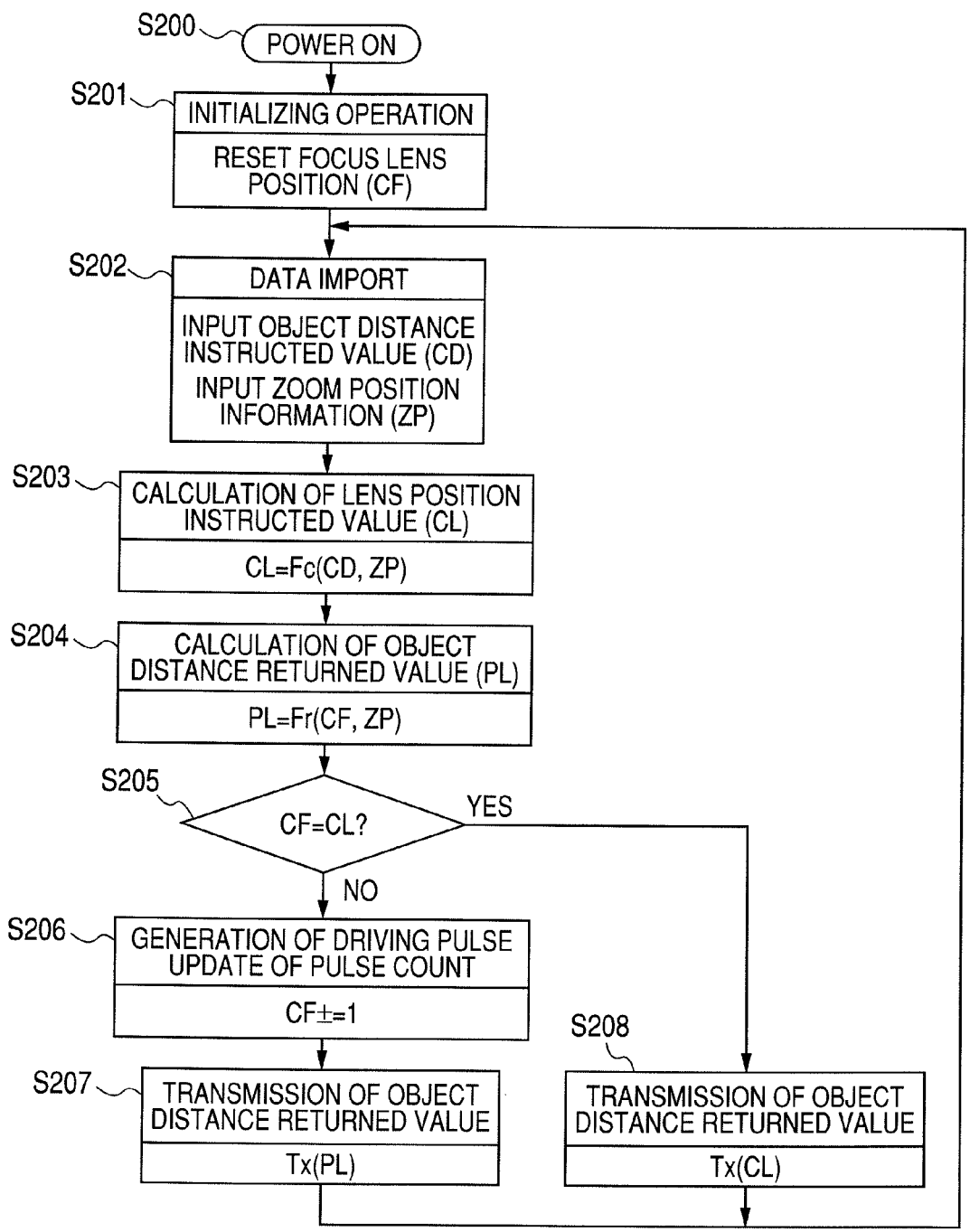
FIG. 2 is an operational flow chart.

FIG. 2 is an operational flow chart illustrating the lens CPU 31 serving as a control unit included in the lens apparatus 30.

After the power on (Step S200), an initializing operation is performed in which the focus lens 33 is led to a predetermined position and then a focus lens position CF is reset (Step S201).

Next, normal lens operation processing is repeated at a constant cycle to capture various data input to the lens CPU 31 serving as the control unit (Step S202).

The object distance instructed value CD corresponding to a driving instruction and a zoom position information value ZP are input as variables to the lens CPU 31.

A focus lens position instructed value CL is calculated using a function Fc based on the object distance instructed value CD and the zoom position information value ZP (Step S203).

Figure 3:
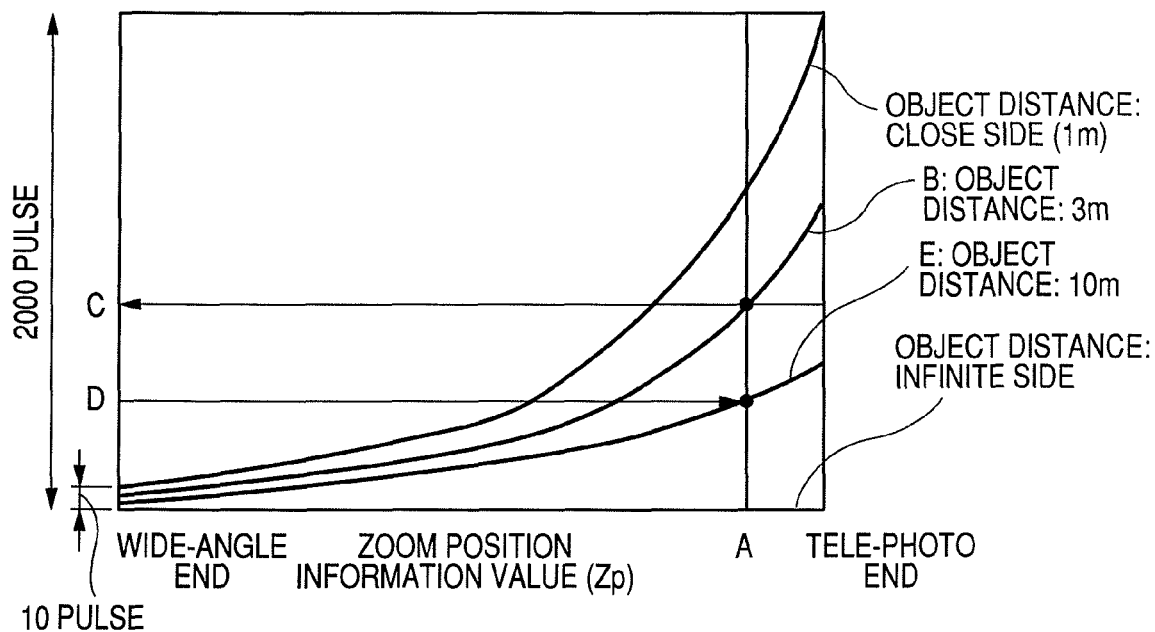
FIG. 3 is a graph illustrating a relationship among a focus lens position, a zoom position, and an object distance.

The calculation is normally performed by a method of deriving the focus lens position instructed value CL from a data table indicating a characteristic as illustrated in FIG. 3.

For example, when the zoom position information value ZP is "A" and the object distance instructed value CD is "B", the focus lens position instructed value CL is a value of "C".

An object distance returned value PL transmitted to the camera apparatus 20 is calculated using a function Fr (Step S204).

The calculation corresponds to the inverse operation of the above-mentioned function fc and is performed to obtain the current focus lens position CF and the object distance returned value PL which is position information of the zoom position information value ZP.

In FIG. 3, when the focus lens position CF is "D" and the zoom position information value ZP is "A", the object distance returned value PL is a value of "E".

Note that the object distance returned value PL in Step S204 is desirably calculated as any value between lengths of fields located before and after the focus lens position CF and thus there is no problem even when a center value is not used.

Next, the lens CPU 31 serving as the control unit determines whether the focus lens position instructed value CL is equal to the focus lens position CF (Step S205) or not.

When the focus lens position instructed value CL is not equal to the focus lens position CF, a processing for driving the focus lens 33 to a position specified by the focus lens position instructed value CL is performed (Step S206).

That is, in Step S206, pulses for rotating the focus motor 34 are generated by the lens CPU 31 and the focus lens position CF is updated.

The focus lens position CF is fundamentally obtained by the counting of a drive pulse and the addition and subtraction thereof. Therefore, after that, the object distance returned value PL is transmitted to the camera apparatus 20 (Step S207).

On the other hand, when the focus lens position instructed value CL is equal to the focus lens position CF in Step S205, the lens driving processing is not executed.

Then, the lens CPU 31 transmits, to the camera apparatus 20, the object distance instructed value CD (driving instruction) input from the camera apparatus 20 as the object distance returned value PL (Step S208).

Figure 4:
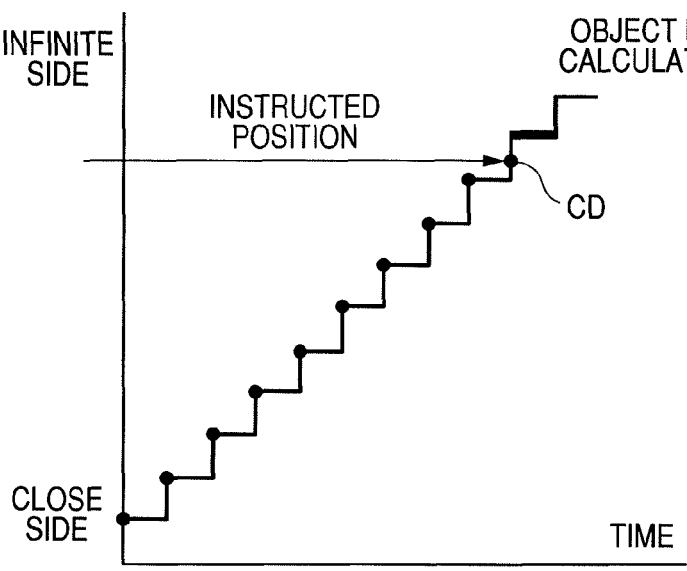
FIG. 4 is an explanatory diagram illustrating a change process of an object distance returned value during operation.

FIG. 4 is an explanatory diagram illustrating a behavior of the object distance returned value PL.

A case is illustrated in which the focus lens 33 is currently located in an object distance infinite side position and the object distance instructed value CD indicating a position is transmitted from the camera apparatus 20. A position specified by an arrow corresponds to the transmitted object distance instructed value CD.

An object distance calculated value has a step-shaped path and thus the focus lens 33 is moved to a next pulse position at the time of step-up.

Before the focus lens 33 reaches a position instructed position indicated by a bold line, the object distance returned value PL is the object distance calculated value. At the time of reaching the instructed position, the object distance instructed value CD is returned to the object distance returned value PL. Therefore, a path that changes in a predetermined direction as illustrated by black circles is obtained.

The calculated object distance returned value PL is transmitted to the camera apparatus 20 through the lens interface portion 24.

Then, the AF processing portion 23 checks the current position of the focus lens 33 and makes a determination if the focus lens 33 is being driven or stopped. The AF processing portion 23 obtains the object distance instructed value CD based on the edge component information included in the current image signal in order to further improve the focusing, and transmits the obtained object distance instructed value to the lens apparatus 30.

When such a series of operations is repeated, the focus lens 33 can be led to a focusing position.

According to this structure, for example, when the focus lens 33 reaches the position corresponding to the object distance instructed value CD from the camera apparatus 20, the object distance returned value PL specified by the camera apparatus 20 is returned.

Figure 5A:
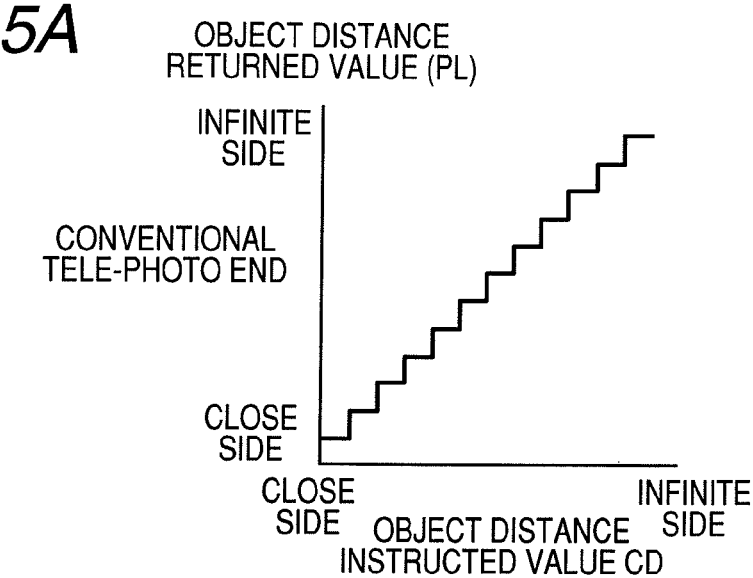
FIGS. 5A, 5B and 5C are explanatory diagrams illustrating an object distance instructed value and an object distance returned value in conventional examples of a tele-photo end and a wide-angle end, and Embodiment 1 of the present invention.
Figure 5B:
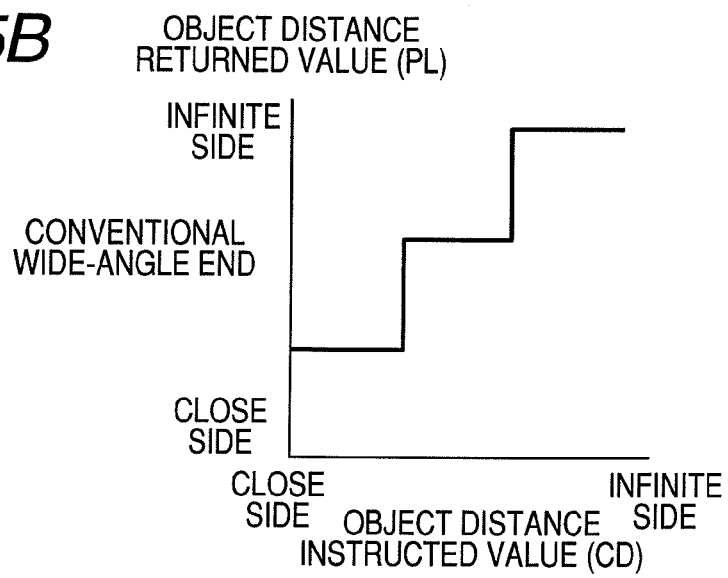
Figure 5C:
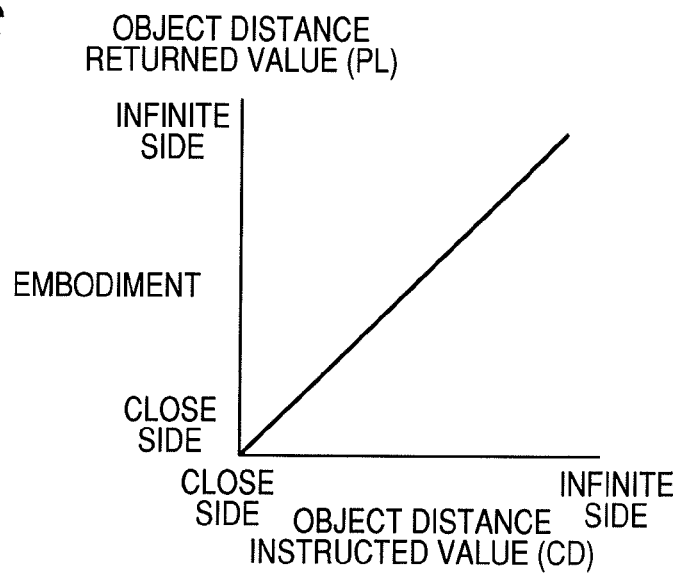
Figure 7:
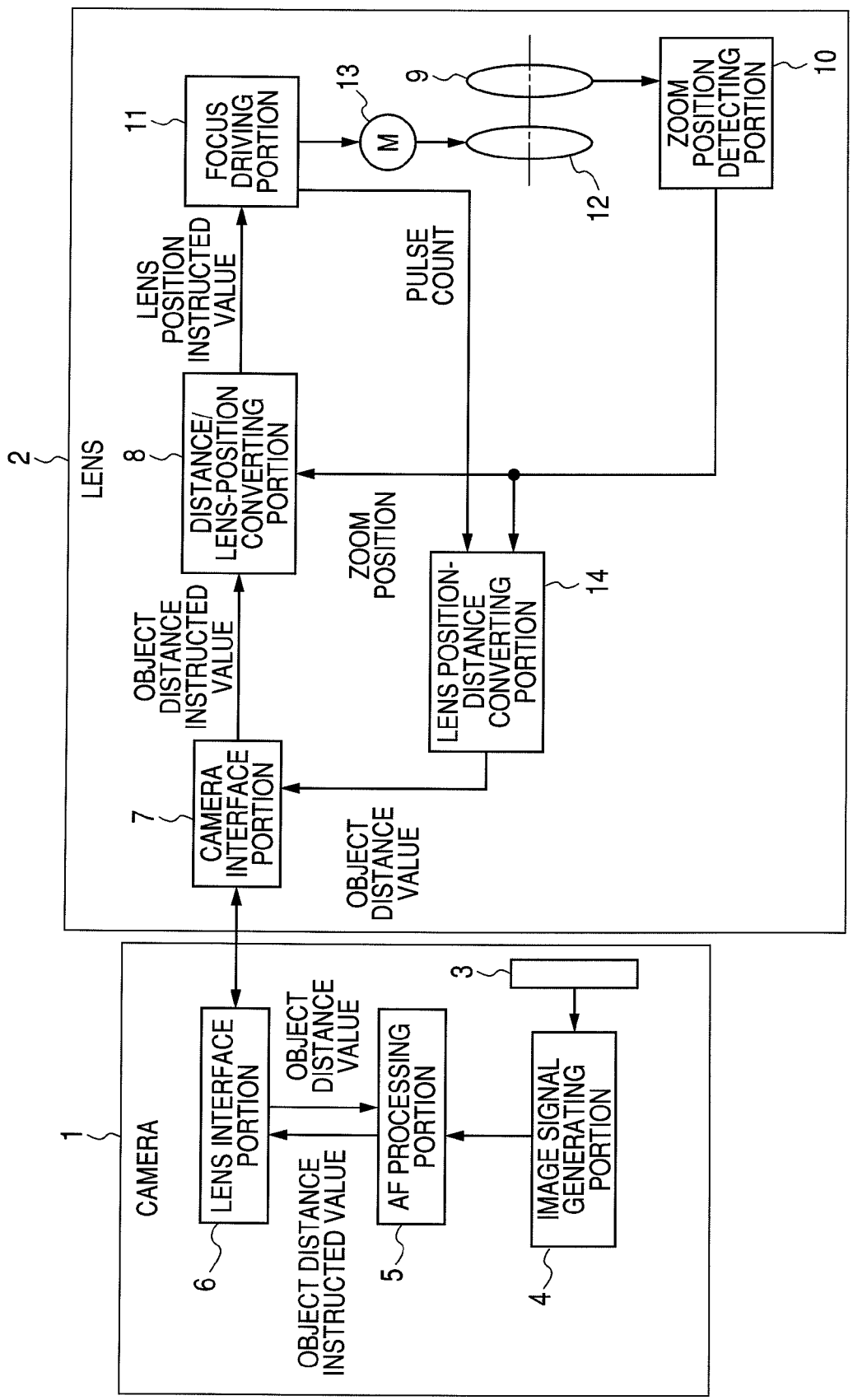
FIG. 7 is a structural block circuit diagram illustrating a conventional example.

Therefore, a state of the object distance returned value PL corresponding to a change in the object distance instructed value CD is changed in a step shape in each of a conventional tele-photo end case (FIG. 5A) and a conventional wide-angle end case (FIG. 5B). In contrast to this, according to this embodiment, the linear state is obtained as illustrated in FIG. 5C.

Thus, a threshold value for determining the behavior of the focus lens 33 in the camera apparatus 20 side can be uniquely set without depending on the zoom position information value ZP, which makes the processing easier.

In this embodiment, the object distance information is used as communication. A value obtained by normalizing the physical position of the focus lens 33 between the infinite end and the close end may be used as communication.

Even in the case of an optical structure in which no focus driving region is changed according to the zoom position, such as a front focusing structure, there is no problem.

Even when at least one of the states of optical mechanisms is moved by a discretely-operated object such as a step motor (actuator) as in the case of driving such as rising or zooming other than focusing, the same effect is obtained.

According to the description in this embodiment, the step motor is used and the open loop control is employed. A focus lens position detecting mechanism such as an encoder may be used for position information.

The camera apparatus to and from which the lens apparatus is attachable and detachable is described above.

However, when a processing portion including an integrated microcomputer has a structure in which a camera processing portion and a lens processing portion separately operate and lens position information is transmitted to and received from the camera processing portion, an image taking apparatus in which the lens apparatus and the camera apparatus are integrally provided may be employed.

Embodiment 2

A driving instruction type is normally divided into two, a position instruction and a speed instruction. The position instruction is an instruction for providing a target position as described in Embodiment 1. The lens apparatus 30 moves the focus lens 33 to the target position specified by a maximum driving speed.

On the other hand, the object speed instruction is an instruction for providing a moving direction and a driving speed to the focus motor 34 to move the focus lens 33.

Embodiment 2 describes an operation at the time of the object speed instruction. FIG. 6 is its operational flow chart.

Note that the same block circuit structure as FIG. 1 is used and the description of the same processing steps as Embodiment 1 is omitted.

In FIG. 6, after the completion of the initializing operation (Step S201), an object speed instructed value CS corresponding to a driving instruction is input as a variable to the lens CPU 31 by data capture (Step S601).

The object speed instructed value CS indicating a speed is converted at a cycle of cycle processing into the object distance instructed value CD corresponding to a position to which the focus lens 33 is to be moved (Step S602).

This operation is performed by integrating the object speed instructed value CS corresponding to the driving instruction at a predetermined cycle. After the object speed instructed value CS is converted into the object distance instructed value CD, the same processing as Embodiment 1 is performed.

Even in Embodiment 2, as the same manner as in Embodiment 1, when the focus lens position instructed value CL is equal to the focus lens position CF in Step S205, the lens driving processing is not executed.

Then, the lens CPU 31 transmits, to the camera apparatus 20, the object speed instructed value CS input from the camera apparatus 20 as the object distance returned value PL (Step S208).

According to the structure, the object distance returned value PL at the time of slow moving in the wide-angle end can be continuously changed, unlike the conventional example in which the object distance returned value is changed stepwise.

In Embodiment 2, the example of the object speed instructed value CS is described. Even in each of the case of the lens position instruction and the object distance instructed value CD, when the differentiation of the processing cycle is performed to set a target position for each unit time, the object distance returned value which is more finely changed can be transmitted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-061552, filed Mar. 12, 2007, which is hereby incorporated by reference herein in its entirety.

What is claimed is:

1. A lens apparatus attachable to and detachable from a camera apparatus, comprising:
    a zoom lens;
    an optical mechanism disposed in the camera-apparatus-side of the zoom lens and including a focus lens which moves for focusing;
    a receiving unit that receives a driving instruction for driving the optical mechanism from the camera apparatus;
    a detecting unit that detects position information of the optical mechanism;
    a lens CPU that outputs a position instructed value of the optical mechanism in accordance with the driving instruction, and calculates a position of the optical mechanism;
    a driving unit that drives the optical mechanism based on the position instructed value output from the lens CPU; and
    a transmission unit, wherein the transmission unit transmits the driving instruction or data calculated on the basis of the driving instruction to the camera apparatus when the driving unit does not drive the optical mechanism and the camera apparatus performs the image taking operation for the object whose image is to be taken,
    wherein the driving unit drives the optical mechanism to a discrete position.

2. A lens apparatus according to claim 1,
    wherein the driving unit varies a driving amount of the focus lens in accordance with a position of the zoom lens.

3. A lens apparatus according to claim 1,
    wherein the number of the discrete positions change in accordance with a position of the zooming lens.

4. A lens apparatus according to claim 1, wherein the data transmitted to the camera apparatus by the transmission unit is continuously-changing data in accordance with a variation of the driving instruction.

5. A lens apparatus according to claim 1, wherein the driving unit drives the optical mechanism on the basis of a position instruction value derived from the driving instruction.

6. A lens apparatus according to claim 5, wherein in a case that the position instruction value is directed to the position detected by the detecting unit, the transmission unit transmits the driving instruction to the camera apparatus.

7. A lens apparatus according to claim 5, wherein in a case that the position instruction value is not directed to the position detected by the detecting unit, the transmission unit transmits information including the position of the optical mechanism detected by the detecting unit to the camera apparatus.

8. A lens apparatus according to claim 1, wherein the driving instruction includes a distance to the object.

9. An image taking apparatus, comprising:
    a lens apparatus; and
    a camera apparatus attachable to and detachable from the lens apparatus,
    wherein the lens apparatus comprises:
    a zoom lens;
    an optical mechanism disposed in the camera-apparatus-side of the zoom lens and including a focus lens which moves for focusing;
    a receiving unit that receives a driving instruction for driving the optical mechanism from the camera apparatus;
    a detecting unit that detects position information of the optical mechanism;
    a lens CPU that outputs a position instructed value of the optical mechanism in accordance with the driving instruction, and calculates a position of the optical mechanism;
    a driving unit that drives the optical mechanism based on the position instructed value output from the lens CPU; and
    a transmission unit, wherein the transmission unit transmits the driving instruction or data calculated on the basis of the driving instruction to the camera apparatus when the driving unit does not drive the optical mechanism and the camera apparatus performs the image taking operation for the object whose image is to be taken,
    wherein the driving unit drives the focus lens to a discrete position.

10. An image taking apparatus according to claim 9, wherein the driving instruction includes a distance to the object.

* * * * *